(12) United States Patent
Iwami

(10) Patent No.: US 6,878,777 B2
(45) Date of Patent: Apr. 12, 2005

(54) GOLF BALL

(75) Inventor: Satoshi Iwami, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 46 days.

(21) Appl. No.: 10/329,486

(22) Filed: Dec. 27, 2002

(65) Prior Publication Data

US 2003/0158340 A1 Aug. 21, 2003

(30) Foreign Application Priority Data

Dec. 27, 2001 (JP) ........................................ 2001-395956

(51) Int. Cl.$^7$ ................................................. A63B 37/12
(52) U.S. Cl. ...................... 525/179; 525/261; 525/274; 473/378; 473/385
(58) Field of Search ................... 525/179, 261, 525/274; 473/378, 385

(56) References Cited

U.S. PATENT DOCUMENTS

| | | | |
|---|---|---|---|
| 5,697,856 A | 12/1997 | Moriyama et al. | |
| 5,716,293 A | 2/1998 | Yabuki et al. | |
| 5,935,021 A | 8/1999 | Kashiwagi et al. | |
| 6,465,578 B1 * | 10/2002 | Bissonnette et al. | 525/261 |
| 6,575,848 B2 * | 6/2003 | Bissonnette et al. | 473/377 |

FOREIGN PATENT DOCUMENTS

| | | |
|---|---|---|
| JP | 62-64378 A | 3/1987 |
| JP | 63-9461 A | 1/1988 |
| JP | 1-223980 A | 9/1989 |
| JP | 6-319832 A | 11/1994 |
| JP | 10-179802 A | 7/1998 |
| JP | 10-225532 A | 8/1998 |
| JP | 2001-70478 A | 3/2001 |

OTHER PUBLICATIONS

Yamamoto, Shinji, et al. Journal of the Society of Rheology, Japan; Nihon Reoroji Gakkaishi vol. 25, No. 5, 275–282, 1997.

* cited by examiner

Primary Examiner—David J. Buttner
(74) Attorney, Agent, or Firm—Birch Stewart Kolasch & Birch, LLP

(57) ABSTRACT

A golf ball providing rebound performance, spin performance, resistance to abrasion and anti-wearability in an excellent balance is formed of a core and a cover arranged to cover the core and formed mainly of diene rubber having a smaller trans structure content before it is crosslinked than after it is crosslinked, in particular by 2 to 20%. The diene rubber is preferably polybutadiene rubber and as the cover's co-crosslinking agent a metallic salt of α,β-ethylene unsaturated carboxylic acid is used.

12 Claims, No Drawings

GOLF BALL

BACKGROUND OF THE INVENTION

1. Field of the Invention

The present invention relates golf balls providing rebound performance, spin performance, resistance to abrasion, and anti-wearability in an excellent balance.

2. Description of the Background Art

Conventionally, a golf ball having a thread-wound layer formed at a liquid center and a balata cover covering thereof has widely been used by advanced golfers and professional golfers as being excellent in shot feel and controllability. Such a golf ball, however, has a structure that makes the manufacturing process complicated, and is poor in durability and resistance against abrasion.

On the other hand, ionomer resin is excellent in rebound performance, durability, anti-wearability and workability and it is widely used as a covering material. Ionomer resin, however, is stiff and hard and provides uncomfortable feel, impaired spin performance, and poor controllability.

Accordingly, covering materials have been developed to provide golf balls with improved, required characteristics which are well balanced.

Japanese Patent Laying-Open No. 62-64378 proposes a cover composition for a golf ball where a fine fiber having an amide group is blended in a cover material containing trans-polyisoprene as a main component to improve rebound property, spin property and cut resistance.

Japanese Patent Laying-Open No. 63-9461 proposes a cover composition for a golf ball where 5–42 parts by mass of trans-polybutadiene, 1–15 parts by mass of fine fiber having an amide group, and 5–30 parts by mass of natural rubber are blended in 100 parts by mass of a cover material containing trans-polyisoprene as a main component, as a cover material that realizes the best possible performance, that is, a flight distance of a multi-dimple type golf ball.

Japanese Patent Laying-Open No. 1-223980 proposes a thread-wound golf ball using a cover material where inorganic single crystal fibers are blended in a trans-1,4-polyisoprene-based cover material to improve a flight distance of the ball.

U.S. Pat. No. 5,716,293 discloses the use of a solid rubber center containing an oily material and a soft cover material to improve a shot feel and to increase a spin amount with a short iron as well. Since this technique uses an oil proof rubber or an ionomer resin having a high hardness for the outer side of the solid rubber center, the rebound performance and the shot feel is yet to be improved.

U.S. Pat. No. 5,935,021 proposes a technique to improve rebound property, durability and cut resistance by blending fibrous aluminum borate whiskers in a main material of a thermoplastic resin or a thermoplastic elastomer. This technique, however, reduces the rebound performance of the cover material by blending the aforementioned whiskers.

Japanese Patent Laying-Open No. 10-179802 proposes a golf ball where a base resin of a cover is formed of a two-component heated mixture, as a main component, of an ionomer resin and a styrene-butadiene-styrene block copolymer having a polybutadiene block containing an epoxy group or a styrene-isoprene-styrene block copolymer having polyisoprene block containing an epoxy group, characterized in that the composition forming the cover has a flexural modulus of 50–300 MPa and a Shore D hardness of 40–60. This technique is intended to improve the shot feel, the spin performance and the flight performance, but the cut resistance is still to be improved.

Japanese Patent Laying-Open No. 10-225532 proposes a cover composition for a golf ball formed of a resin composition in which aluminum borate whiskers are blended in a resin material made of an ionomer resin as a base material to improve durability.

Japanese Patent Laying-Open No. 6-319832 proposes a composition as a cover material formed by blending a core shell polymer made of (a) a core of a rubber-like polymer having an epoxy group or a carboxyl group or an acid anhydride group on the surface and (b) a shell of a glassy polymer, into an ethylene-unsaturated carboxylic acid copolymer, to improve a soft feeling and durability as well as rebound performance.

Japanese Patent Laying-open No. 2001-70478 proposes for a covering material a rubber compound formed of polybutadiene having a cis 1,4 structure content of at least 40% with 5 to 40% by weight of α,β-ethylene unsaturated carboxylic acid, 5 to 40 weight of a metal oxide, and 0.1 to 5 parts by weight of a polymerization initiator blended therewith. However, it is not satisfactory in anti-wearability, resistance to abrasion, and rebound performance.

The Journal of the Society of Rheology, Japan, Vol. 25 (1997) has reported a development of a micro disperse system super-fine fiber reinforced composite prepared from a rubber-polyolefin-nylon ternary graft copolymer as an application of the plastic field.

U.S. Pat. No. 5,697,856 discloses that a golf ball has a core formed using polybutadiene rubber serving as a rubber base material and containing a cis 1,4 structure content of no less than 90% prior to vulcanization and a trans structure content of 10 to 30% after vulcanization and the core also has a hardness decreasing in difference in the direction of the depth.

These conventional techniques cannot improve the rebound performance, the spin performance, the cut resistance, durability, and feeling on the whole.

SUMMARY OF THE INVENTION

The present invention contemplates a golf ball having rebound performance, spinning performance, resistance to abrasion, and furthermore anti-wearability improved, well balanced.

The present invention is a golf ball including a core and a cover arranged on the core, characterized in that the cover is formed mainly of diene rubber having a trans structure content smaller before it is vulcanized than after it has been vulcanized. Preferably the diene rubber is polybutadiene rubber. Furthermore the cover preferably contains a metallic salt of α,β-ethylene unsaturated carboxylic acid as a co-crosslinking agent. Furthermore in accordance with the present invention in another embodiment the cover contains a ternary composite formed of a rubber component, a polyolefin component and a nylon component.

In the present invention preferably after the cover's diene rubber has been crosslinked it has a trans structure content T2 and before it is crosslinked it has a trans structure content T1 with a difference T2−T1 of 2% to 20%. Furthermore in the present invention the cover can be formed with a ternary composite mixed therewith, the ternary composite being formed of a rubber component, a polyolefin component and a nylon component.

The foregoing and other objects, features, aspects and advantages of the present invention will become more apparent from the following detailed description of the present invention.

DESCRIPTION OF THE PREFERRED EMBODIMENTS

The present invention is a golf ball including a core and a cover arranged to cover the core, characterized in that the cover is formed mainly of diene rubber having a trans structure content smaller before it is vulcanized than after it has been vulcanized.

Diene Rubber

Diene rubber used to form the cover of the present golf ball is suitably formed mainly of polybutadiene rubber having a cis-1,4-structure content of at least 40%, although transpolyisoprene, natural rubber, styrene-butadiene rubber, isoprene rubber and the like can also be used independently or in the form of a mixture. Furthermore, chloroprene rubber, butyl rubber, ethylene-propylene rubber, ethylene-propylene-diene rubber, acrylicnitrile rubber or the like can be mixed into the diene rubber by not more than 30 parts by mass.

Co-Crosslinking Agent

In the rubber compound described above, a metallic salt of α,β-ethylene unsaturated carboxylic acid produced by blending the α,β-ethylene unsaturated carboxylic acid such as acrylic acid or methacrylic acid and a metal oxide each into a rubber compound and allowing them to react with each other while they are kneaded, or a metallic salt of the α,β-ethylene unsaturated carboxylic acid such as zinc acrylate or zinc methacrylate, magnesium acrylate, magnesium methacrylate, as well as a multi-functional monomer, N,N'-phenylbismaleimide, and the like may be used as a co-crosslinking agent. In particular the metallic salt of the α,β-ethylene unsaturated carboxylic acid is suitably used.

If the metallic salt of the α,β-ethylene unsaturated carboxylic acid is used, 10–40 parts by mass thereof is preferably blended relative to 100 parts by mass of the diene rubber. On the other hand, if the α,β-ethylene unsaturated carboxylic acid and a meal oxide are each blended into a rubber compound and allowed to react with each other while they are kneaded, then relative to 100 parts by mass of diene rubber 15–30 parts by mass of α,β-ethylene unsaturated carboxylic acid is preferably blended and relative to the α,β-ethylene unsaturated carboxylic acid 20–35% by mass of zinc oxide, magnesium oxide or any other similar metal oxide is preferably blended.

Crosslink Initiator

An organic peroxide, for example, dicumyl peroxide, 1,1-bis(t-butyl peroxy) 3,3,5-trimethylcyclohexane, 1,1-bis (t-hexylperoxy) cyclohexane, t-butylperoxybenzoate, t-butylcumylperoxide or the like is used as a cross-linking initiator. 0.1–5 parts by mass, preferably 0.3–3 parts by mass of the initiator is blended relative to 100 parts by mass of diene rubber.

Trans Structure Content

In the present invention the cover's diene rubber before it is crosslinked has a trans structure content T1 and that after it has been crosslinked has a trans structure content T2 with a relationship T1<T2. More specifically, diene rubber having a small trans content before it is crosslinked is used and in a crosslinking reaction a configuration is rearranged from a cis1,4 structure to a trans structure to obtain crosslinked diene rubber having a large trans structure content. As a result the cover material has an increased coefficient of restitution and enhanced durability. If diene rubber having a large trans structure content before it is crosslinked is crosslinked, the cover material does not provide an improved coefficient of restitution. In contrast, if diene rubber having a small trans structure content both before and after it is crosslinked, e.g., high cis diene rubber can provide a coefficient of restitution improved to an extent, although it is inferior in durability.

Difference T2–T1 is 2 to 20%, preferably 3 to 18%, more preferably 5 to 15%, still more preferably 5 to 11%. To rearrange a cis 1,4 structure to a trans structure, an organic sulfur compound is typically used, and to provide increased trans structure contents, increased amounts of the organic sulfur compound need to be blended. As such, if difference T2–T1 exceeds 20%, the excessive amount of the organic sulfur compound results in a reduced coefficient of restitution and hence insufficient hardness. As a result the ball cannot provide a resilient feel and thus provides a heavy feel at impact. If difference T2–T1 is small, rearrangement to a trans structure would not contribute to an improved coefficient of restitution.

Trans structure content T1 is 1 to 7%, preferably 3 to 7%, more preferably 4 to 6%. If trans structure content T1 is excessive, rebound performance tends to decrease.

Note that a trans structure content can be measured by a combination of the ATR method and the KBR method using a Fourier transform infrared spectrophotometer.

Organic Sulfur Compound

In the present invention, a cis 1,4 structure is rearranged to a trans structure by any method, although blending an organic sulfur compound is effective in doing so. The organic sulfur compound is pentachlorothiophenol, 4-t-butylthiophenol, 2-benzamidethiophenol or any other similar thiophenols, thiobenzoic acid or any other similar thiocarboxylic acid, diphenylmonosulfide, diphenyldisulfide, diphenylpolysulfide, morpholinedisulfide, dixylyldisulfide, alkylated phenolsulfide or any other similar sulfides, and preferably it is a combination of diphenylsulfide and pentachlorothiophenol or any other similar thiophenol.

Condition for Crosslinking Reaction

The above rubber compound can be crosslinked by a conventional method. To facilitate rearrangement of diene rubber to a trans structure, however, 2-step crosslinking is preferable. At the first step it is heated at 135 to 155 degrees centigrade for 20 to 50 minutes and at the second step it is heated at 160 to 180 degrees centigrade for 5 to 20 minutes. Such 2-step heating can facilitate rearrangement to a trans structure and help to adjust the amount of the rearrangement to fall within a predetermined range.

Mixture of Ternary Composite

In the present invention the cover's composition can be blended with a ternary composite. The ternary composite is formed of the three components of a rubber component, a polyolefin component and a nylon component. These three components are chemically bound with each other to form a composite material where the fine nylon component is evenly distributed in a matrix of the rubber component and the polyolefin component.

The rubber component is limited to those which does not undergo gelation at a high temperature at the time of kneading and reaction with nylon and spinning, such as natural rubber, polyisoprene, ethylene-propylene-diene rubber (EPDM), nitrile-butadiene rubber (NBR), hydrogenated NBR (H-NBR). Ethylene-propylene-diene rubber (EPDM) is particularly suitable.

A low-density polyethylene, a high-density polyethylene, polypropylene is used as the polyolefin component, and polypropylene is particularly preferable.

Nylon 6, nylon 66, nylon 11, nylon 12 is used as the nylon component. Nylon 6 is particularly preferable. The ratio of these combined components may be adjusted as appropriate depending on the required characteristics of the golf ball cover material. This ternary composite is developed by Ube Industries, is known under the trade name of SHP sold by Daiwa Polymer, and has the following grades according to the composition ratio:

PA3060:
  EPDM/PP/nylon 6=100/100/100;
HA1060:
  NR/HDPE/nylon 6=100/75/87;
LA1060:
  NR/LDPE/nylon 6=100/75/87;
LA3080:
  EPDM/LDPE/nylon 6=100/40/105;
LA5060:
  H-NBR/LPDE/nylon 6=100/100/100; and
Z040NB:
  NBR/LPDE/nylon 6=100/75/75 where NR is natural rubber, HDPE is a high-density polyethylene, LDPE is a low-density polyethylene, NBR is acrylonitrile-butadiene rubber, and H-NBR is a hydrogenated NBR. The composition ratio is expressed by parts by mass.

It is noted that the average diameter of the nylon fiber used in the ternary composite is normally not more than 10 $\mu$m and preferably in the range of 0.05–1 $\mu$m. In the matrix of the ternary composite, the polyolefin component (for example HDPE) forms a continuous phase.

The ternary composite (for example SHP) is normally manufactured in the following three steps:
  (1) kneading and reaction of the rubber component and the polyolefin component;
  (2) kneading and reaction of the rubber component, the polyolefin component and nylon; and
  (3) spinning.

First of all, the rubber, the polyolefin and a reaction agent are introduced in a closed kneader to obtain a kneading and reaction product. Here a sea-island structure is formed where the polyolefin is the sea and the rubber is the island. This kneading and reaction product as well as the nylon are fed into a twin-shaft extruder with a reaction agent to obtain a ternary graft polymer of rubber-polyolefin-nylon, that is, a ternary composite. By adjusting a graft rate, the nylon is evenly distributed in the rubber-polyolefin matrix, for example, as particles of 2–3 $\mu$m.

Thereafter the product is extruded from a nozzle installed at the end of the twin-shaft extruder and drawn with draft. Through this spinning step, the nylon particles in the extruded product strand are deformed and converted into a fiber-like product. The nylon fiber diameter is normally controlled in the range of 0.2–0.3 $\mu$m, in consideration of the productivity, depending on a draft ratio. Since the polyolefin phase forms the sea in these steps, the viscosity is reduced to enable pelletization.

It is noted that the ternary composite used in the present invention is manufactured based on the description in the Journal of the Rheology Society, Japan, Vol. 25 (1997) pp. 275–282, where the composition can be further adjusted.

Mixture of Diene Rubber and Ternary Composite

In accordance with the present invention, the blended amount of the ternary composite is in the range of 1–30 parts by mass with respect to 100 parts by mass of diene rubber. Preferably, it is 2–25 parts by mass, in particular 5–20 parts by mass. In this case, the content of nylon component included in the ternary composite affects the reinforcing effect of the cover. If the blended amount of the ternary composite is less than one part by mass, the nylon short fiber has a less reinforcing effect. If the blended amount exceeds 30 parts by mass, the hardness of the cover is increased and the elastic modulus is reduced.

The ternary composite is used to prepare a cover composition, as follows: the diene rubber and the ternary composite, e.g., SHP are introduced into a closed kneader and kneaded. At that point, a kneading temperature has to be lower than a melting point of the nylon component in the ternary composite. If the temperature is higher than the melting point of the nylon component, the fiber is melted and the reinforcement by the fiber is lost. If the kneading temperature is lower than the temperature of the polyolefin, however, the ternary composite is not distributed in the rubber and remains in pellets. During this kneading, a phase transition of the polyolefin and the rubber takes place in the matrix, and the polyolefin is finely distributed in the rubber. The other blended agent is thereafter added and mixed, resulting in a cover composition. When the ternary composite is being mixed together or after it has been mixed, the blended agents as described above are mixed using a roll, a kneader, a Banbury, and the like and subjected to vulcanization using a mold under pressure at 145° C. to 200° C., preferably at 120° C. to 175° C. for 10–40 minutes to produce the cover composition.

Other Agents Blended for Cover

The cover composition described above may be blended with a filler, a pigment such as titanium dioxide, a dispersant, an antioxidant, a ultraviolet absorber, a photostabilizer, a fluorescent material or a fluorescent brightening agent, and the like, as necessary, in such a range that cannot impair the desired characteristics of the golf ball cover. The filler can be one or more of inorganic powder of barium sulfate, calcium carbonate, clay, zinc oxide, and the like. Preferably, 5–50 parts by mass of the filler is blended relative to 100 parts by mass of diene rubber. In addition, for the purpose of improving workability, hardness adjustment, and the like, a softener, a liquid rubber, and the like may be blended as appropriate.

Structure and Characteristics of Cover

In the present invention the cover is formed of a single layer. The cover has a thickness adjusted to range from 0.3 to 3 mm, preferably 0.5 to 2.5 mm, more preferably 0.7 to 1.5 mm. Furthermore the cover has a shore D hardness adjusted to range from 46 to 58, preferably 48 to 54 to provide an optimized feel at impact. Furthermore the cover's specific gravity is preferably set to range from 0.98 to 1.2, more preferably 1.05 to 1.15, to adjust spin rate.

Rubber Compound of Core

The present golf ball's core is formed of a rubber compound containing co-crosslinked diene rubber, and polybutadiene rubber having a cis-1,4 structure is a most preferable rubber component, although natural rubber, styrene-butadiene rubber, isoprene rubber, chloroprene rubber, butyl rubber, ethylene-propylene rubber, ethylene-propylene-diene rubber, acrylicnitrile rubber can be blended by not more than 40 parts by mass.

In the rubber compound described above, a metallic salt of $\alpha,\beta$-ethylene unsaturated carboxylic acid such as zinc acrylate and zinc methacrylate, as described above, as well as a multi-functional monomer, N,N'-phenylbismaleimide, sulfur, and the like is used as a cross-linking agent. In particular, the metallic salt of the $\alpha,\beta$-ethylene unsaturated carboxylic acid is suitably used.

If the metallic salt of the $\alpha,\beta$-ethylene unsaturated carboxylic acid is used, for example, the blended amount thereof is preferably 5–40 parts by mass with respect to 100 parts by mass of diene rubber. On the other hand, if the α,β-ethylene unsaturated carboxylic acid is reacted with a metal oxide during the preparation of the rubber compound, the blended amount relative to 100 parts by mass of the rubber component is preferably 15–30 parts by mass of α,β-ethylene unsaturated carboxylic acid and 10–35 parts by mass of the metal oxide such as zinc oxide with respect to the α,β-ethylene unsaturated carboxylic acid.

One or more of inorganic powder of barium sulfate, calcium carbonate, clay, zinc oxide, and the like can be used as the filler used in the rubber compound described above. Furthermore, an organic peroxide, for example, dicumyl peroxide, 1,1-bis(t-butyl peroxy)3,3,5-trimethylcyclohexane or the like is used as the cross-linking initiator. The blended amount of the cross-linking initiator is preferably 0.1–5 parts by mass, particularly 0.3–3 parts by mass with respect to 100 parts by mass of diene rubber.

In accordance with the present invention, the core as described above may be of a single layer or of a multi-layer having different characteristics such as specific gravity and hardness. In this case, the formulation of the core is not limited to the formulation as described above.

Characteristics of Core

Furthermore the present golf ball can employ a thread-wound core and a solid core. When the solid core is compressed under a load of 10 kg (98N) to 130 kg (1275N) it deforms preferably in a range of 3.0 to 5.0 mm, more preferably 3.2 to 4.5 mm. If less than 3.0 mm, the shot feel tends to be deteriorated. On the other hand, if more than 5.0, the rebound property is adversely effected. The solid core is designed to have a diameter in a range of 36.8–42.2 mm, preferably 37.8–41.4 mm. If less than 36.8 mm, the thickness of the cover layer is increased and the rebound property is reduced. On the other hand, if more than 42.2 mm, the thickness of the cover layer is reduced and the molding becomes difficult.

Multi-layered Core

In the present invention the core can be formed of a single layer as well as a plurality of layers. The multi-layered core can have an outermost layer contacting a cover and formed using a polymer compound corresponding to the aforementioned rubber compound used for the core as well as thermoplastic resin, thermoplastic elastomer, ionomer resin, the composition used for the cover, or a mixture thereof.

The thermoplastic resin can be thermoplastic olefin resin, e.g., polyethylene, polypropylene, polystyrene, ABS resin, acrylic resin and methacryl resin, and furthermore polyamide resin, polyurethane resin, polyester resin.

The thermoplastic elastomer includes thermoplastic polyurethane elastomer, thermoplastic polyester elastomer, thermoplastic polyamide elastomer, and thermoplastic olefin elastomer.

The thermoplastic polyurethane elastomer is formed of a hard segment of a urethane structure and a soft segment of polyester or polyether. Listed as trade names are Miractran from Nippon Miractran Co., Ltd., Pandex from Dainippon Ink & Chemicals, Paraprene from Nippon Polyurethane Industry Co., Ltd., Pellethane from Dow Chemical Japan Limited, Elastollan from BASF Polyurethane Elastomers Ltd.

The thermoplastic polyester elastomer is formed of a hard segment of a polyester structure and a soft segment of polyether or polyester. Listed as trade names are Hytrel from Du Pont-Toray Co., Ltd., Pelprene P. S from Toyobo Co., Grilux E from Dainippon Ink & Chemicals, Primalloy from Mitsubishi Chemical Corporation, and the like.

The thermoplastic polyamide elastomer is formed of a hard segment of polyamide and a soft segment of polyether or polyester. Listed as trade names are Pebax from Toray Industries Ltd., Daiamid PAE from Daicel-Degussa Ltd., Grilux A from Dainippon Ink & Chemicals, Novamid PAE from Mitsubishi Engineering-Plastics Corporation, UBE-PAE from Ube Industries, Grilon ELX and Grilamid ELY from EMS Japan, S-TPAE from Sekisui Chemical Corporation, and the like.

The thermoplastic olefin elastomer is referred to as a concept including an olefin unit in a molecular chain, a so-called thermoplastic styrene elastomer, and includes a block copolymer having a soft segment and a hard segment in the molecule. The soft segment is a unit such as a butadiene block or an isoprene block derived from a conjugated diene compound. As the conjugated diene compound, for example, one or two or more kinds can be selected from butadiene, isoprene, 1,3-pentadiene, 2,3-dimethyl-1,3-butadiene, and the like, and butadiene, isoprene and the combination thereof are particularly preferable among others. The component that forms a hard segment includes a polyethylene block, a polypropylene block or a styrene block. They are derived from ethylene, propylene, styrene, and a derivative of styrene, for example, a compound formed by selecting one or two or more kinds from α-methylstyrene, vinyltoluene, p-tertiary butylstyrene and the like.

The thermoplastic styrene elastomer includes, for example, a styrene-isoprene-butadiene-styrene block copolymer (SIBS structure), a styrene-butadiene-styrene block copolymer (SBS structure), styrene-ethylene-butylene-styrene block copolymer corresponding to the hydrogenated double bonded portion of the butadiene thereof (SEBS structure), styrene-isoprene-styrene block copolymer (SIS structure), styrene-ethylene-propylene-styrene block copolymer corresponding to the hydrogenated double bonded portion of that isoprene (SEPS structure), and a modified product thereof, and the like.

The ionomer resin is, for example, a binary copolymer of an α-olefin and an α,β-unsaturated carboxylic acid having 3–8 carbon atoms, that is produced by neutralizing at least a part of the carboxyl group with metal ion. Also listed is a ternary copolymer of an α-olefin, an α,β-unsaturated carboxylic acid having 3–8 carbon atoms, and an α,β-unsaturated carboxylate having 2–22 carbon atoms, that is produced by neutralizing at least a part of the carboxyl group with metal ion.

In the present invention the core's outermost layer can be formed using a polymer compound with the ternary composite (e.g., SHP) mixed together. They are introduced into a sealed kneader and kneaded therein. It should be noted that they are kneaded at a temperature lower than a melting point of the nylon component in the ternary composite. If the temperature is higher than the melting point of the nylon component, the fiber is melted and the reinforcement by the fiber is lost. If the kneading temperature is lower than the temperature of the polyolefin component of the ternary composite, however, the ternary composite is not distributed in the rubber compound and remains in pellets. During this kneading, a phase transition of the polyolefin and the rubber takes place in the matrix, and the polyolefin is finely distributed in the rubber. The other blended agent is thereafter added and mixed, resulting in the polymer compound of the outermost layer of the core.

Production of Golf Ball

In accordance with the present invention, the cover can be molded on a core using a known method. For example for a two-piece ball formed of a core and a cover, the cover composition is formed into a semi-spherical half-shell in advance and the core is wrapped with two half-shells in a press molding at 130–170° C. for 1–5 minutes. Alternatively, the cover composition described above may be injection-molded directly onto the core to wrap the core. The cover has a thickness of 0.3–3.0 mm. If less than 0.3 mm, the cover is likely to crack when hit repeatedly. If more than 3.0 mm, the shot feeling becomes worse. Furthermore, at the time of molding the cover, a number of dimples are formed on the surface as necessary. The golf ball of the present invention is normally finished with paint, stamped with marking, etc. in order to improve the appearance to increase a market value for introduction in the market.

The golf ball of the present invention uses a thread-wound core, a single-layered or multi-layered solid core, and may be employed in either a thread-wound ball or a solid ball.

It is noted that in accordance with the present invention, the cover may be of a single layer. The golf ball in accordance with the present invention is normally designed to have a diameter in the range of 42.67–43.00 mm and a weight in the range of 45.00–45.93 g.

When the present golf ball is compressed under a load of 10 kg (98N) to 130 kg (1275N) it deforms in a range of 2.0–4.0 mm, preferably 2.5 mm-3.5 mm. If less than 2.0 mm, the shot feel tends to be deteriorated. On the other hand, if more than 4.0, soft feel is provided at impact and the rebound property is adversely effected.

EXAMPLES

Examples 1–4 and Comparative Examples 1–3

(1) Production of the Core

TABLE 1

Core Formulation

| core formulation | A | B |
|---|---|---|
| BR-18 [1) | 100 | 100 |
| zinc acrylate | 33 | 33 |
| zinc oxide | 13.0 | 15.0 |
| diphenyl disulfide [2) | 0.5 | 0.5 |
| dicumyl peroxide [3) | 1.0 | 1.0 |
| core diameter (mm) | 41.2 | 41.2 |
| vulcanization conditions | 170° C. for 15 min. | 170° C. for 15 min. |
| deformation under compression (mm) | 2.90 | 2.85 |

Note that blended agents shown in Table 1 are as follows:
[1) BR-18: high-cis-polybutadiene rubber produced by JSR Corporation
[2) diphenyl disulfide: produced by Sumitomo Seika Chemical Co., Ltd.
[3) dicumyl peroxide: produced by NOF Corporation.

Of the cover compositions shown in Table 2, blends Nos. 1–5 and 7 were each kneaded and thereafter molded into a pair of half shells which were in turn arranged around the cover and pressed to form a golf ball. In doing so, it was vulcanized at 150 degrees centigrade for 20 minutes and at 165 degrees centigrade for 8 minutes. For blend No. 6, a core is covered by a cover injection-molded. Thereafter, a surface is painted to complete a golf ball having a diameter of 42.8 mm and a weight of 45.4 g. The blended components were partially identical to Table 1.

TABLE 2

Cover Formulation

| Formulation No | 1 | 2 | 3 | 4 | 5 | 6 | 7 |
|---|---|---|---|---|---|---|---|
| UBEPOL VCR412 ※1 | — | — | — | — | — | — | 100 |
| BR18 | 100 | 100 | 100 | 100 | 100 | — | — |
| zinc acrylate | 30 | 30 | 30 | 30 | 30 | — | 30 |
| zinc oxide | 12 | 12 | 12 | 12 | 12 | — | 12 |
| diphenyl disulfide | — | 0.5 | 0.5 | 1.0 | — | — | — |
| pentachlorothlophenol ※2 | — | — | — | — | 1.0 | — | — |
| titanium oxide | 4 | 4 | 4 | 4 | 4 | 4 | 4 |
| dicumylperoxide | 0.9 | 0.9 | 0.9 | 1.5 | 2.0 | — | 0.9 |
| SHP LA1060 ※3 | — | — | 15 | — | — | — | — |
| Hi-milan 1855 ※4 | — | — | — | — | — | 50 | — |
| Hi-milan 1856 ※5 | — | — | — | — | — | 50 | — |
| surface hardness (Shore D) | 56 | 53 | 52 | 50 | 48 | 54 | 55 |
| specific gravity | 1.11 | 1.11 | 1.11 | 1.11 | 1.11 | 0.99 | 1.11 |
| trans content T1 before crosslinking reaction (%) | 5% | 5% | 5% | 5% | 5% | — | 12% |
| trans content T2 after crosslinking reaction (%) | 5% | 10% | 10% | 13% | 16% | — | 12% |

※1 UBEPOL VCR412: polybutadiene rubber produced by Ube Industries, Ltd
※2 pentachlorothiophenol: organic sulfur compound
※3 SHP LA1060: short fiber reinforced composite material formed of a rubber/polyolefin/nylon ternary graft copolymer produced by Daiwa Polymer
※4 ionomer of an ethylene-methacrylic acid-butyl acrylate, ternary copolymer neutralized with Zn produced by Du Pont-Mitsui Polychemicals Co., Ltd.
※5 ionomer of an ethylene-methacrylic acid-butyl acrylate, ternary copolymer neutralized with Na produced by Du Pont-Mitsui Polychemicals Co., Ltd.

As shown in Table 1, two types of core rubber compounds using polybutadiene rubber as a main component were kneaded and adjusted, and then introduced into a die and vulcanized and molded therein at 170° C. for 15 minutes to produce a spherical solid core having a diameter of 41.2 mm. The solid core provides deformation under compression, as represented in millimeters, as shown in Table 1.

Performance Estimation

A golf ball thus obtained was estimated in resistance to abrasion, anti-wearability, spin performance, and coefficient of restitution (index).

(1) Resistance to Abrasion

A swing robot of True Temper Sports which had a pitching wedge attached thereto and was set to provide a head speed of 36 m/sec was used to hit each golf ball at two portions. The two struck portions were observed in accordance with the following criterion:

○: a scratch is left on the ball surface slightly enough to be ignored.

Δ: a scratch is clearly left on the ball surface and scuffing is slightly found.

X: the ball surface is considerably scratched and scuffing is obvious.

(2) Wear Resistance

Taper wear was measured according to ASTM D-1044. The smaller the numerical value is, the better the wear resistance is.

(3) Spin Performance

A swing robot of True Temper Sports which had a sand wedge attached thereto and was set to provide a head speed of 21 m/sec was used to hit each golf ball. The ball's spin rate was measured with a high-speed camera.

(4) Coefficient of Restitution

Each golf ball was impinged on by an aluminum cylinder of 200 grams at a speed of 45 m/sec and the cylinder's speed and the ball's speed after the impingement were measured. From their respective speeds and weights the ball's coefficient of restitution was calculated. Each ball was measured five times and the average of the five measurements was provided as the ball's coefficient of restitution, represented by a relative value with respect to the first example. Larger values indicate more excellent rebound performance.

(5) Deformation under Compression

The core or the golf ball was subjected to an initial load of 98N and a final load of 1275N for measurement of deformation, as represented in millimeters.

(6) Core Hardness

Shore D hardness was measured with a spring-type hardness Shore D tester as defined in accordance with ASTM-D2240.

Result of Estimation

Table 3 shows results of estimation of the golf balls of examples 1–4 and those of comparative examples 1–3.

before and after it is crosslinked, provides low resistance to abrasion, low anti-wearability, and a low coefficient of restitution.

The first example uses polybutadiene rubber having a trans structure content varying from 5% to 10% after it is crosslinked. The second example employs the rubber compound of the first example with a ternary composite further blended therewith. The third example employs polybutadiene rubber having a trans structure content varying from 5% to 13% after it is crosslinked. The fourth example employs polybutadiene rubber having a trans structure content varying from 5% to 16% after it is crosslinked. It can be understood that the first to fourth examples all provide large resistance to abrasion, excellent anti-wearability, and larger coefficients of restitution. In particular, the fourth example, using diphenylsulfide and pentachlorothiophenol in combination as an organic sulfur compound, provides a further increased trans structure content and hence further enhanced performance.

The present golf ball has a cover formed using a compound formed mainly of diene rubber providing an increased trans structure content when it is crosslinked.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A golf ball formed of a core and a cover arranged to cover said core, wherein said cover is formed mainly of diene rubber having a smaller trans structure content before said rubber is crosslinked than after said rubber is crosslinked, and wherein said cover contains a ternary composite formed of a rubber component, a polyolefin component and a nylon component.

2. The golf ball of claim 1, wherein said diene rubber is polybutadiene rubber.

TABLE 3

| | Performance of Golf Ball | | | | | | |
|---|---|---|---|---|---|---|---|
| | Examples | | | | Comparative Examples | | |
| | 1 | 2 | 3 | 4 | 1 | 2 | 3 |
| core formulation | A | A | A | A | A | B | A |
| core diameter (mm) | 41.2 | 41.2 | 41.2 | 41.2 | 41.2 | 41.2 | 41.2 |
| cover formulation | 2 | 3 | 4 | 5 | 1 | 6 | 7 |
| cover hardness (shore D) | 53 | 52 | 50 | 48 | 56 | 54 | 52 |
| cover thickness (mm) | 0.8 | 0.8 | 0.8 | 0.8 | 0.8 | 0.8 | 0.8 |
| deformation when compressed (mm) | 2.70 | 2.75 | 2.78 | 2.80 | 2.60 | 2.65 | 2.70 |
| abrasion resistance | ○ | ○ | ○ | ○ | Δ | X | Δ |
| wear resistance | 20 | 18 | 15 | 13 | 30 | 100 | 40 |
| spin rate (rpm) | 6900 | 6950 | 7100 | 7200 | 6750 | 6700 | 6800 |
| coefficient of restitution | 100 | 101 | 102 | 103 | 98 | 97 | 96 |

The first comparative example, forming a cover using polybutadiene providing a small trans structure content of 5% both before and after it is crosslinked, is inferior in resistance to abrasion and anti-wearability. The second comparative example, providing a cover formed using ionomer resin, provides low resistance to abrasion, low anti-wearability, and a low coefficient of restitution. The third comparative example, forming a cover using polybutadiene rubber providing a high trans structure content of 12% both 3. The golf ball of claim 1, wherein said cover contains a metallic salt of α,β-ethylene unsaturated carboxylic acid as a co-crosslinking agent.

4. The golf ball of claim 1, wherein there is a difference (T2−T1) of 2% to 20% between a trans structure content (T2) of said diene rubber having been crosslinked and that (T1) of said diene rubber having not yet crosslinked.

5. The golf ball of claim 2, wherein said cover contains a metallic salt of α,β-ethylene unsaturated carboxylic acid as a co-crosslinking agent.

6. The golf ball of claim 1, wherein the cover has a thickness of from 0.3 to 3 mm and a Shore D hardness of 46 to 58.

7. The golf ball of claim 6, wherein the cover thickness is 0.5 to 2.5 mm.

8. The golf ball of claim 6, wherein the cover thickness is 0.7 to 1.5 mm.

9. The golf ball of claim 6, wherein the cover has a Shore D hardness of 48 to 54.

10. The golf ball of claim 4, wherein the difference (T2−T1) is 3% to 18%.

11. The golf ball of claim 4, wherein the difference (T2−T1) is 5% to 15%.

12. The golf ball of claim 4, wherein the difference (T2−T1) is 5% to 11%.

* * * * *